United States Patent [19]

Sun et al.

[11] Patent Number: 5,338,803
[45] Date of Patent: Aug. 16, 1994

[54] MODIFIED CPE FOR PVC IMPACT MODIFICATION

[75] Inventors: Yun C. Sun, Folsom, Calif.; David W. Liou, Baton Rouge, La.

[73] Assignee: The Dow Chemical Company, Midland, Mich.

[21] Appl. No.: 868,908

[22] Filed: Apr. 16, 1992

[51] Int. Cl.$^5$ ................... C08F 255/02; C08F 259/02
[52] U.S. Cl. ................... 525/309; 525/302; 525/324; 525/80
[58] Field of Search ................... 525/302, 309, 324

[56] References Cited

U.S. PATENT DOCUMENTS

| | | |
|---|---|---|
| 3,887,648 | 6/1975 | Takahashi et al. ................... 525/319 |
| 3,970,718 | 7/1976 | Takahashi et al. . |
| 4,486,559 | 12/1984 | Murata et al. ................... 525/120 |
| 4,536,545 | 8/1985 | Oelner et al. . |
| 4,537,933 | 8/1985 | Walker et al. . |
| 4,562,229 | 12/1985 | Walker et al. . |
| 4,605,704 | 8/1986 | Eastman et al. . |
| 4,661,549 | 4/1989 | Walker . |
| 4,806,581 | 2/1989 | Walker . |

*Primary Examiner*—Vasu S. Jagannathan

[57] ABSTRACT

Modified chlorinated polyethylene (CPE) for use as an impact modifier for polyvinyl chloride, comprising a thermoplastic grafted CPE prepared by polymerizing compatible monomers or comonomers, e.g. methyl methacrylate/styrene, methylmethacrylate or vinyl acetate, onto the CPE backbone via an aqueous slurry suspension polymerization and the process of producing the cited modified chlorinated polyethylene.

24 Claims, No Drawings

MODIFIED CPE FOR PVC IMPACT MODIFICATION

BACKGROUND OF THE INVENTION

This invention relates to compositions useful for modifying the properties of thermoplastic polymers such as polyvinyl chloride and to methods for making such compositions.

The use of polymeric materials to modify the impact properties of rigid polyvinyl chloride (PVC) is widely known. For example, the addition of polyacrylic resins, butadiene-containing polymers such as acrylonitrile butadiene styrene terpolymers (ABS) and methacrylate butadiene styrene terpolymers (MBS), and chlorinated polyethylene (CPE) resins to rigid PVC is known to increase the impact strength of PVC products such as house siding panels, vinyl window frames, electrical conduit, and blow molded PVC bottles. Impact modifiers are typically used in these applications at from 5 to about 15 parts by weight per 100 parts of PVC resin. The PVC resin typically used in these applications is classified as medium or high molecular weight.

In the case of impact modification of low molecular weight PVC resins, such as are used in injection molding applications, the melt viscosity of the impact modifying material is higher than that of the PVC resin. This fact can result in poor dispersion and broad particle-size distribution of the impact modifier with the effect of the PVC compounds having low impact strength. Some improvement in impact strength can be gained by increasing the amount of impact modifier in the compound but this is economically counter-productive. The purpose of this invention is to provide polymeric materials that will serve as efficient impact modifiers for PVC materials, particularly those materials based on low molecular weight PVC.

SUMMARY OF THE INVENTION

The present invention concerns polymeric compositions for improving the impact strength of rigid PVC polymers and methods for making the same. The compositions are chlorinated linear polyethylene (CPE) resins graft polymerized with an ethylenically unsaturated monomer, such as methyl methacrylate (MMA), the grafted composition being prepared in an aqueous suspension process. Prior to the copolymerization in the aqueous suspension slurry it is important to disperse the monomers or the comonomers into suspended CPE by diffusion. This intimately mixed CPE and monomer network will then copolymerize by free-radical initiation to form a network structure of CPE and grafted copolymers. Polymerization is then commenced using a free radical initiator at an elevated temperature.

DETAILED DESCRIPTION OF PREFERRED EMBODIMENTS

The grafted CPE polymeric compositions of the present invention are prepared by graft polymerizing an ethylenically unsaturated monomer onto a chlorinated polyethylene backbone. Polymerization may be accomplished via a free radical mechanism and is commenced after the chlorinated polyethylene has been in contact with the ethylenically unsaturated monomer allowing the ethylenically unsaturated monomer to disperse into the CPE. The purpose of this contact time is to enable the monomer to penetrate the CPE polymer thereby permitting enhanced graft polymerization during the polymerization step to form a network structure of CPE and grafted copolymers.

The chlorinated polyethylene in the current invention is an elastomer containing from about 30% to about 42% chlorine by weight and preferably from about 33% to about 39%. In a most preferred embodiment the chlorine content is 34% to 38%. The weight average molecular weight of the chlorinated polyethylene ranges from about 80,000 to about 250,000; preferably from about 120,000 to about 240,000; and more preferably from about 175,000 to about 225,000. The CPE is preferably produced in an aqueous slurry process using a linear polyethylene having a density of at least 0.940g/cc as the base material. The CPE produced is low in crystallinity as measured by differential scanning calorimetry (DSC) and preferably is below 1 cal/g via DSC. In the most preferred embodiment, the residual crystallinity of the CPE is at or below 0.5 cal/g.

Chlorinated polyethylene materials meeting the aforementioned physical property criteria can be prepared by a procedure of the type disclosed in commonly-assigned U.S. Pat. No. 3,454,544.

As used herein, the term alkyl refers to alkyl groups having from 1 to about 8 carbon atoms. The term lower alkyl refers to alkyl groups having from 1 to about 4 carbon atoms.

Ethylenically unsaturated monomers, such as ethylenically unsaturated carboxylic acid esters, useful in the current invention can be aliphatic or aromatic and include: acrylates, alkyl acrylates, lower alkyl acrylates, alkyl methacrylates, lower alkyl methacrylates, and other carboxylic acid esters including vinyl esters e.g. vinyl acetate, vinyl propionate, vinyl butyrate, vinyl stearate, vinyl benzoate and vinyl p-chlorobenzoate, and monovinyl aromatic compounds, including styrene, alpha methyl styrene, and t-butyl styrene. Additionally, mixtures of such ethylenically unsaturated carboxylic acid esters and monovinyl aromatic compounds are also useful in this invention.

Preferred monomers are the alkyl methacrylates, the lower alkyl methacrylates, vinyl acetate, and styrene, with the most preferred being methyl methacrylate. Another highly preferred monomer is vinyl acetate. Preferred mixtures of monomers include mixtures of acrylates and styrenics, of alkyl acrylates and styrenics, of lower alkyl acrylates and styrenics, of alkyl methacrylates and styrenics, of lower alkyl methacrylates and styrenics, of acrylates and vinyl esters, of alkyl acrylates and vinyl esters, of lower alkyl acrylates and vinyl esters, of alkyl methacrylates and vinyl esters, and of lower alkyl methacrylates and vinyl esters. A highly preferred mixture is of methyl methacrylate and styrene. Another highly preferred mixture is of methyl methacrylate and vinyl acetate.

The polymerizable mixture comprises in a preferred embodiment from about 60 parts to about 95 parts by weight of chlorinated polyethylene and from about 5 to about 40 parts by weight of an ethylenically unsaturated monomer or monomer mixture.

The preferred process for making modified CPE products with improved impact modifying characteristics involves the mixing of CPE resin, an ethylenically unsaturated monomer or mixture of monomers, water, initiators, and other additives such as a suspending agent in a suspension process reactor. The reactants are mixed through conventional stirred agitation and form a slurry suspension. Prior to the copolymerization in the aqueous suspension slurry it is important to disperse the monomers or the comonomers into suspended CPE by diffusion. This intimately mixed CPE and monomer network will then copolymerize by free-radical initiation to form a network structure of CPE and grafted copolymers.

The reactor is then heated to a temperature of from about 70° C. to about 110° C. for a time of from about 4 hours to about 14 hours. Preferably the reactor is heated to a temperature of from about 75° C. to about 95° C. for a time of from about 6 hours to about 12 hours, and more preferably is heated to a temperature of from about 80° C. to about 90° C. for a time of from about 8 hours to about 10 hours.

After polymerization is complete, the grafted CPE product is dewatered and dried, for example, in a fluidized bed dryer, from about 4 to about 10 hours at a temperature of about 50° C. to about 75° C. preferably from about 5 to about 10 hours at a temperature of about 55° C. to about 70° C., and more preferably from about 6 to about 9 hours at a temperature of about 60° C. to about 65° C.

Initiators useful in this preferred free radical polymerization process are the known organic perester and peroxide type initiators. Especially useful are the organic perester and peroxide initiators having a one hour half-life temperature of about 90° C.–120° C. Typical and useful perester and organic peroxide initiators are benzoyl peroxide, lauroyl peroxide, 1,1-di-(t-amyl-peroxy)-cyclohexane, 1-1-di-(t-butylperoxy)cyclohexane, and tertiary butyl peroctoate. Tertiary butyl peroctoate having a one hour half-life temperature of about 115° C. is the most preferred initiator.

For obtaining a good suspension, vigorous stirring is performed and a suspension stabilizer or suspending agent is used. The conventional suspension stabilizers are preferred in this invention and include such organic materials as the polyvinyl alcohols, polyalkylene oxides and cellulose derivatives, with the cellulose derivatives being most preferred. Typical of the most preferred cellulose derivatives are methyl cellulose, hydroxymethyl cellulose, and methyl hydroxypropyl cellulose with hydroxymethyl cellulose being most preferred.

In a preferred embodiment of this invention, a graft polymerized chlorinated polyethylene product is prepared in an aqueous suspension having the following reactant composition

| Composition I | |
|---|---|
| Component | Parts by Weight |
| Chlorinated polyethylene | 60–95 |
| Ethylenically unsaturated monomer or mixture of monomers | 5–40 |
| T-butyl peroctoate initiator | 0.2–1.0 based on monomers |
| Hydroxymethyl cellulose | 0.2–1.0 |

The following examples are given for further illustration of the invention. Unless otherwise specified, the parts in the examples are on a weight basis.

EXAMPLE I

The components listed in Composition II were charged to a 10 gallon reactor and mixed with stirring at room temperature to provide a suspension system.

| Composition II | |
|---|---|
| Component | Parts by Weight |
| Chlorinated polyethylene powder having a weight average molecular weight of 225,000 and a degree of chlorination of 36% | 73.0 |
| Methyl methacrylate monomer | 16.2 |
| Styrene monomer | 10.8 |
| Hydroxymethyl cellulose (suspending agent) | 0.4 |
| Tertiary butyl peroctoate (initiator) | 0.5 |
| Demineralized water | 100.00 |

After mixing to form the suspension system and allowing the ethylenically unsaturated monomer to disperse into the CPE, the reactor was heated to a temperature of 85° C. to begin the polymerization process. The polymerization reaction was carried out for 9 hours at 85° C. with constant stirring. After polymerization, the resultant polymer was cooled, separated from the water, water washed and dried in a fluidized bed dryer at 60° C. for a time of 8 hours. The grafted polymer was in the form of a free-flowing powder. Total conversion under these conditions was about 98%.

EXAMPLE II

The components listed in Composition III were charged to a 10 gallon reactor and mixed with stirring to provide a suspension system.

| Composition III | |
|---|---|
| Component | Parts by Weight |
| Chlorinated polyethylene powder having a weight average molecular weight of 210,000 and a degree of chlorination of 35.7% | 85 |
| Vinyl acetate monomer | 15 |
| Hydroxymethyl cellulose | 0.4 |
| Tertiary butyl peroctoate | 0.5 |
| Demineralized water | 100 |

After mixing to form the suspension system and allowing the ethylenically unsaturated monomer to disperse into the CPE, the reactor was heated to a temperature of 90° C. to begin the polymerization process. The polymerization reaction was carried out for 8 hours at 90° C. with constant stirring after which the reactor was cooled and the resultant polymer separated, washed and dried as in Example I. Total conversion under these conditions was 98%.

The CPE resin used in the preferred embodiment is Tyrin ® 3615 brand of chlorinated polyethylene manufactured by The Dow Chemical Company. The suspending agent used is Methocel ® KHM brand of hydroxymethyl cellulose ether manufactured by The Dow Chemical Company. Monomers and initiators are available from several sources in the chemical industry.

The following examples are given to show the improved impact efficiency of the grafted CPE polymers over convential ungrafted CPE materials. The PVC resins used in these examples are classified as high and low molecular weight respectively. It is preferable to talk about solution viscosity values of PVC rather than molecular weight and in this context a high molecular weight PVC, designed for extrusion purposes, typically has a solution viscosity of 0.89–0.93 centipoises when measured as a 0.20 concentration in cyclohexanone at 80° C. A low molecular weight PVC, as may be used in injection molding applications, typically has a solution viscosity of 0.59–0 66 under the same conditions Another method of stating solution viscosity is to use a term called "K value", a correlative solution viscosity method developed by Fikenscher using 1,2 -dichloroethane as the solvent. High molecular weight PVC resins are commonly assigned K values of 65–70 while low molecular weight PVC resins would typically have K values in the 50 to 56 range.

EXAMPLE III

The following compositions were mixed at 60 rpm in a Haake Rheocord ® mixer, model 750, manufactured by Haake-Buchler Instruments, Saddlebrook, N.J., for six minutes at a temperature of 180° C.

| Composition IV | |
| --- | --- |
| PVC Resin Georgia Gulf 2066 (K value 55) | 100 phr |
| T-137 Tin Mercaptide stabilizer | 1.5 |
| PARALOID ® K120N | 1.5* |
| Calcium Stearate | 1.5 |
| Amide wax 280 | 2.5 |
| Impact Modifier of this Invention | 10.0** |

The molten product was then compression molded using a press manufactured by Pasadena Hydraulics Inc., City of Industry, Calif., into ⅛ " (3.175 mm) thick plaques under the following conditions:
Preheated under low pressure for 5 minutes at 190° C.;
Molded under 20 tons applied pressure 5 minutes at 190° C.; and
Cooled under 20 tons applied pressure.

The plaques were then cut into 2.5"×0.5"×0.125", (63.50 mm×12.70 mm×3.175 mm) specimens for notched Izod impact testing, as per ASTM D 256 or retained as slabs for dart drop impact testing by a Dynatup ® device, manufactured by Dynatup, Santa Barbara, Calif., or by a Gardner Model 1-G-1120-M falling dart tester, manufactured by Gardner Laboratories, Inc., Bethesda, MD. Results of notched Izod impact testing are given in Table I.

TABLE I

| Modifier | Parts | Notched Izod impact ft. lbs/in. |
| --- | --- | --- |
| None | 0 | 1.03 |
| Tyrin ® 3615 CPE | 10 | 3.74 |
| g CPE/MMA/STYRENE of Example I | 10 | 20.10 |
| g CPE/VA of Example II | 10 | 20.54 |

*not required with grafted CPE/MMA nor grafted CPE/VA
**Total amount of grafted polymer. Actual CPE level is 7.3 phr in grafted CPE/MMA/STYRENE and 8.2 phr in grafted CPE/VA.

The grafted CPE products showed significantly improved notched Izod impact values over the standard Tyrin ® 3615 chlorinated polyethylene and at lower actual CPE loadings. The PARALOID K120N is a polymethylmethacrylate based resin from Rohm and Haas that was melt blended into the PVC resin with no impact modifier and into the PVC - Tyrin ® 3615 CPE compound. Incorporation of MMA as a grafted polymer with CPE showed much higher impact values than the PMMA added as a blend ingredient.

EXAMPLE IV

The following compositions were prepared using the same conditions as utilized for Example III. The results of notched Izod impact testing are given in Table II.

| Composition V | |
| --- | --- |
| PVC Resin SHINTECH 950 (K value 67) | 100 phr |
| T137 Tin Mercaptide stabilizer | 1.5 |
| PARALOID ® KI20N | 1.5* |
| Calcium Stearate | 1.5 |
| Paraffin wax XL165 | 1.0 |
| Impact Modifier | 10.0** |

TABLE II

| Modifier | Parts | Notched Izod Impact ft. lbs/in. |
| --- | --- | --- |
| None | 0 | 1.5 |
| Tyrin 3615 | 10 | 19.0 |
| g CPE/MMA | 10 | 25.3 |
| g CPE/VA | 10 | 26.0 |

*not used with grafted CPE/MMA nor grafted CPE/VA
**Total amount of grafted polymer. Actual CPE level is 7.3 phr in grafted CPE/MMA and 8.2 phr in grafted CPE/VA.

The grafted CPE products showed improved notched Izod impact values over the standard Tyrin ® 3615 CPE and at a lower actual CPE loading. All the test samples failed in a ductile manner indicating good impact modification.

What is claimed is:

1. A chlorinated polyethylene composition, comprising a chlorinated polyethylene resin having a chlorine content of from about 30% to about 42%, graft polymerized with an ethylenically unsaturated monomer selected from the group consisting of an ethylenically unsaturated carboxylic acid ester monomer, a monovinyl aromatic monomer and mixtures thereof.

2. The composition of claim 1 wherein said ethylenically unsaturated monomer is an ethylenically unsaturated carboxylic acid ester monomer which is an acrylate.

3. The composition of claim 2 wherein said aerylate is a methacrylate.

4. The composition of claim 3 wherein said methacrylate is a lower alkyl methacrylate.

5. The composition of claim 4 wherein said lower alkyl methacrylate is methyl methacrylate.

6. The composition of claim 1 wherein said ethylenically unsaturated monomer is an ethylenically unsaturated carboxylic acid ester monomer selected from the group consisting of vinyl acetate, vinyl propionate, vinyl stearate, vinyl butyrate, vinyl benzoate, and vinyl p-chlorobenzoate.

7. The composition of claim 6 wherein said carboxylic acid ester is vinyl acetate.

8. The composition of claim 1 wherein said ethylenically unsaturated monomer is a monovinyl aromatic monomer.

9. The composition of claim 8 wherein said monovinyl aromatic monomer is styrene.

10. The composition of claim 8 wherein said styrenic material is alpha methyl styrene.

11. The composition of claim 1 wherein said ethylenically unsaturated monomer is a mixture of said ethylenically unsaturated carboxylic acid ester monomer and said monovinyl aromatic monomer and is selected from the group consisting of alkyl acrylates, lower alkyl acrylates, alkyl methacrylates, lower alkyl methacrylates, vinyl esters, styrene, alpha methyl styrene, and tertiary butyl styrene.

12. The composition of claim 11 wherein said ethylenically unsaturated monomer is a mixture of methyl methacrylate and styrene.

13. The composition of claim 11 wherein said ethylenically unsaturated monomer is a mixture of methyl methacrylate and vinyl acetate.

14. The composition of claim 11 wherein said ethylenically unsaturated monomer is a mixture of tertiary butyl styrene and methyl methacrylate.

15. The composition of claim 11 wherein said ethylenically unsaturated monomer is a mixture of alpha methyl styrene and methyl methacrylate.

16. The composition of claim 1 wherein said chlorinated polyethylene has a chlorine content of from about 34% to about 328%.

17. The composition of claim 1 comprising:
  a. from about 60 to 95 parts by weight of chlorinated polyethylene;
  b. from about 5 to about 40 parts by weight of an ethylenically unsaturated monomer selected from the group consisting of an ethylenically unsaturated carboxylic acid ester monomer, a monovinyl aromatic monomer, and mixtures thereof.

18. The composition of claim 17 wherein said degree of chlorination is from about 33% to about 39%.

19. The composition of claim 17 wherein said ethylenically unsaturated monomer is an ethylenically unsaturated carboxylic acid ester monomer which is an acrylate.

20. The composition of claim 19 wherein said acrylate is a methacrylate.

21. The composition of claim 20 wherein said methacrylate is a lower alkyl methacrylate.

22. The composition of claim 21 wherein said lower alkyl methacrylate is methyl methacrylate.

23. The composition of claim 17 wherein said ethylenically unsaturated carboxylic acid ester monomer is a vinyl ester.

24. The composition of claim 23 wherein said vinyl ester is vinyl acetate.

* * * * *